July 22, 1947.  A. J. KRAUSE  2,424,242
THREAD LOCK NUT
Filed May 11, 1942  2 Sheets-Sheet 1
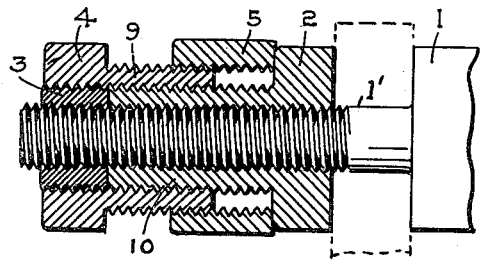
Fig. 1.
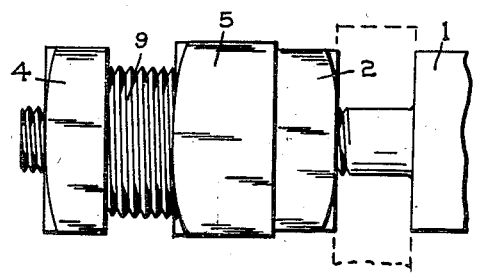
Fig. 2.
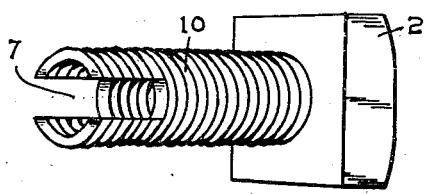
Fig. 3.
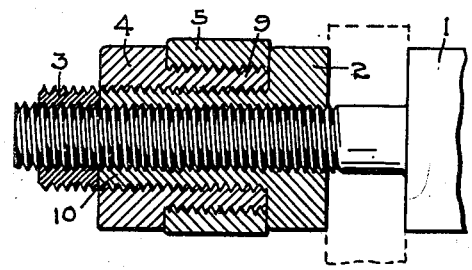
Fig. 4.
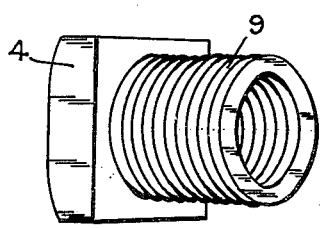
Fig. 5.
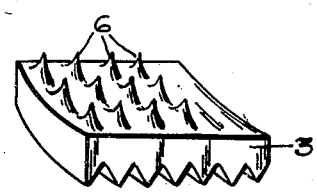
Fig. 6.
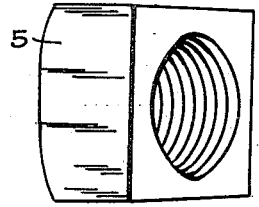
Fig. 8.
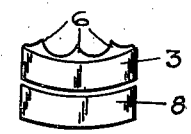
Fig. 7.
Fig. 9.
Fig. 10.
INVENTOR.
Albert J. Krause
BY July 22, 1947.  A. J. KRAUSE  2,424,242
THREAD LOCK NUT
Filed May 11, 1942  2 Sheets-Sheet 2

INVENTOR.
Albert J. Krause,
BY

Patented July 22, 1947

2,424,242

UNITED STATES PATENT OFFICE 2,424,242

THREAD LOCK NUT

Albert J. Krause, Seattle, Wash.

Application May 11, 1942, Serial No. 442,449

2 Claims. (Cl. 151—14)

My present invention relates to an improved thread lock nut of the type employed on bolts to secure the nut from unscrewing due to strain, vibrations or the presence of lubricants.

The purpose of the invention is to provide means to lock a nut to a bolt in such a way that it will not be loosened thereon in use regardless of the forces tending to loosen the nut whether these forces are caused by strain, vibrations or the like and lubricants used on the nut assembly will not cause the nut to loosen on the bolt.

The purposes will be better understood from a perusal of the detailed description thereof in connection with the drawing forming a part of this specification.

In the drawing:

Figure 1 is a longitudinal cross section of the bolt and nut assembly shown in Figure 2.

Figure 2 is a side elevation of the nut and bolt assembly.

Figure 3 is a perspective view of the base nut.

Figure 4 is a longitudinal sectional view similar to Figure 1 but showing parts in different positions for purposes to be later disclosed.

Figure 5 is a perspective view of the supporting nut.

Figure 6 is a much enlarged perspective view of the inlay locking means.

Figure 7 is an end view of a modification of the inlay Figure 6.

Figure 8 is a view, in perspective of the cooperating nut.

Figure 9 is an end view of the locking inlay.

Figure 10 is an end view of a reef of teeth on the inlay locking means.

Figure 11:
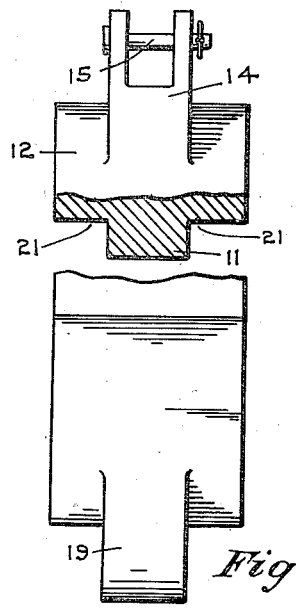
Figure 11 is a view of one part of a pair of clamps.

In the device herein disclosed as an example or embodiment of the invention, there is a bolt 1 having a stem 1' threaded for a major portion of its length, 2 is the base nut having an annular projecting shank 10 as shown in Figure 3.

The base nut 2 is internally threaded throughout its entire length to fit the threads on stem 1' upon which it is threaded.

The shank 10 is of considerable length and it is of a size and exteriorly threaded to receive a supporting nut 4. The nut 4 as shown in Figure 5 has an annular projection 9 extending therefrom. The interior of nut 4 has a bore which is threaded to fit upon threaded shank 10 and said threaded bore extends the entire length of nut 4 including the annular projection which is itself exteriorly threaded throughout its length to fit the internal threads of a cooperating nut 5 shown in Figure 8.

This cooperating nut 5 rests against nut 2 and is annularly spaced from shank 10 a distance such that 9 may be screwed therein to completely take up this space and in so doing projection 9 will screw threadingly engage both the interior threads of part 5 and the external threads of part 10.

The threaded shank 10 is transversely slotted to provide two recesses 7 in which are located the inlays 3 shown in Figure 6. There may be one or a greater number than two recesses 7 in part 10.

The inlays 3 are arcuate in shape and have their exteriors spirally grooved to form part threads such that when inserted in 7 within nut 4 said grooved exteriors complete the threads corresponding to the threads on the exterior of 10 which are cut away by slots 7. The inlays 3 increase in thickness from one end to the other for a purpose to be disclosed below. These inlays have teeth 6 on their interior curved surfaces. Said teeth are in spirally arranged rows so that when arranged in slots 7 their points will fit into the bottoms of the grooves of the threads on the exterior of stem 1'. The inlays 3 are case hardened or they may be modified as shown in Figure 7 wherein each inlay is in two parts and 3 may be case hardened and 8 is a filling piece to back up 3 to fill groove or recess 7.

In use the work to be held by the bolt and nut assembly is clamped between the nut 2 and the head of the bolt 1. The nut 2 is first screwed on 1' against the work to firmly engage the same. Inlays 3 are inserted in grooves 7 so that the teeth thereof are in the grooves between the threads of 1'. Nut 4 is then screwed onto 10 and 3 to such an extent that 3 are flush with the top of 4. Due to the fact that 3 vary in thickness the nut 4 will easily start thereon but as it is screwed on 3 the teeth 6 are forcibly caused to bite into or imbed themselves in the grooves between the threads. It will thus be seen that 2 cannot turn at all since 6 are imbedded in 1' and are in the slots 7. Thus, a very effective lock nut of the type where the nut is coupled to the bolt is provided as shown above.

Figure 12:
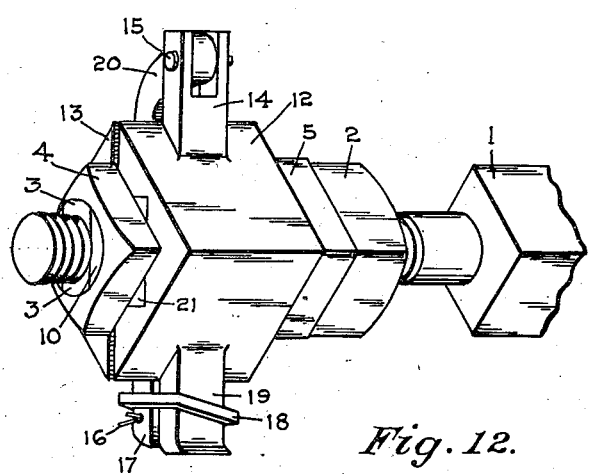
Figure 12 is a perspective view of the pair of clamps used on the assembly shown in Figure 1.
Figure 13:
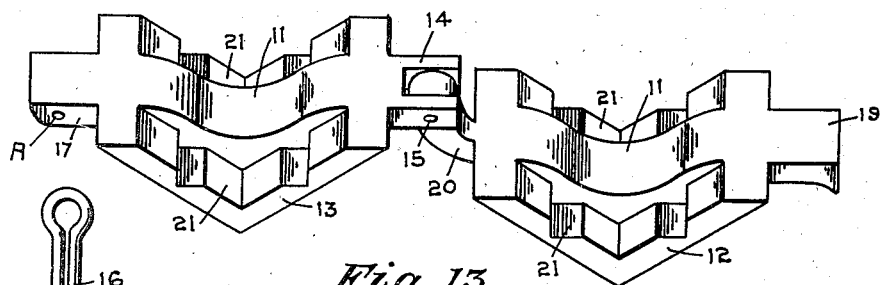
Figure 13 is a perspective view of the pair of clamps shown in opened non-clamping condition.
Figure 14:
Figure 14 is a view of the cotter pin used to retain the square collar of Figure 16 in place.
Figure 15:
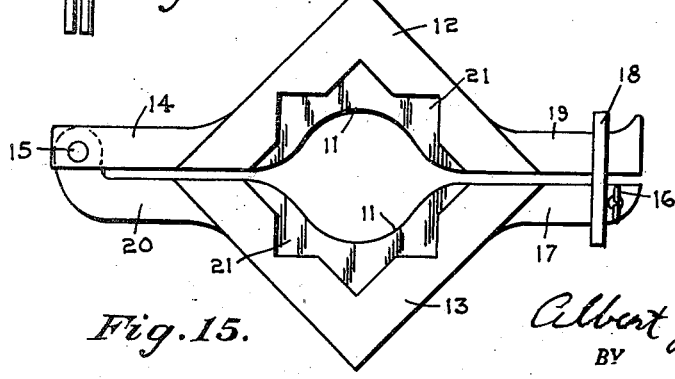
Figure 15 is a plane view of the pair of clamps of Figure 13 in the position they assume when clamping the assembly shown in Figure 1 although shown separated therefrom to better show the clamp.
Figure 16:
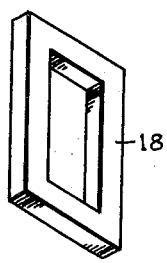
Figure 16 is a perspective view of the square collar used to retain the clamps in clamping condition as shown in Figures 12 and 15.

However, the clamping device of Figures 11 to 16 is preferably used with the above described device. This device consists of a pair of clamp sections 12 and 13 hinged together as shown at 15. Each clamp section has a ridge or the like 11 spaced midway between its faces and each section is cut away or indented as shown at 21, from its outer face to the ridge 11 to such a shape that it may embrace a nut and tightly clamp the same in either one of two positions relatively thereto. Figure 13 shows the clamp open while Figure 15 shows it closed as it is shown in use in Figure 12. The arms 14 and 20 carry the hinge portions and 17 and 19 are used with square collar 18 to lock the clamp in closed condition by placing 18 over the ends 17 and 19 and a cotter pin retains the square collar 18 from removal from 17 and 19. This pair of clamps is used as shown in Figure 12 on the assembly of Figures 1 and 2. The one section of the clamp is placed with the ridge 11 between nuts 5 and 4; the other section is then closed thereon with its ridge between 4 and 5 and it is held so clamped by 18. It will be noted that the shape of indentations 21 are such that faces of nut 5 need not be in alignment with the faces of 4 but may be 45° apart. Thus 4 is locked from turning by the clamp.

It will also be noted that when assembled in a nut locking condition as shown in Figure 1 there is a space within nut 5 below the extension 9 on nut 4 equal to or substantially equal to the length of inlays or inserts 3. It will readily be seen that if the clamp of Figure 15 is removed and nut 4 screwed further onto 10 so that 10 abuts 2 around 10 that 3 are released and can readily be removed at any time that the nut lock is desired to be removed. Then 2, 4, 5 etc. may be removed from the bolt 1 at any desired time and this lock may be used over and over without any deterioration of its effectiveness.

Having described in detail my invention and the manner in which it is used I claim:

1. In a bolt and lock nut assembly, the combination of a bolt, a base nut on the threaded stem thereof to engage the work to be clamped, said nut having an exteriorly threaded extension thereon surrounding said bolt stem, said exteriorly threaded extension being transversely slotted at its outer end to provide recesses therein, toothed locking inlays in said recesses, a second nut screwed on said extension of the first nut overlying said inlays and forcing the teeth of said inlays to bite into the threads of said bolt stem.

2. In a bolt and lock nut assembly, the combination of a bolt, a base nut on the threaded stem thereof to engage the work to be clamped, said nut having an exteriorly threaded extension thereon surrounding said bolt stem, said exteriorly threaded extension being transversely slotted at its outer end to provide recesses therein, toothed locking inlays in said recesses, a second supporting nut screwed on the extension of said base nut and on said inlays and forcing said teeth on said inlays to bite into the threads of said bolt stem, said second supporting nut having an exteriorly screw threaded extension and a third cooperating nut on said extension, and a clamp embracing the supporting nut and said cooperating nut to keep them from relative turning.

ALBERT J. KRAUSE.

REFERENCES CITED

The following references are of record in the file of this patent:

UNITED STATES PATENTS

| Number | Name | Date |
|---|---|---|
| 819,034 | Lamotte | Apr. 20, 1909 |
| 876,081 | Orr | Jan. 7, 1908 |
| 1,528,652 | Brice | Mar. 3, 1925 |
| 280,125 | Branchler | June 26, 1883 |